United States Patent [19]

Tseng

[11] Patent Number: 5,241,732
[45] Date of Patent: Sep. 7, 1993

[54] MULTIPURPOSE CUTTING METAL-WORKING MACHINE

[76] Inventor: Sheng-Lung Tseng, No. 12, Lane 248, Liu-Chang St., San Chuang City, Taipei Hsien, Taiwan

[21] Appl. No.: 917,359

[22] Filed: Jul. 23, 1992

[51] Int. Cl.$^5$ .......................... B23Q 7/14; B23P 23/02
[52] U.S. Cl. ........................................ 29/33 P; 29/560; 29/563; 198/346.1
[58] Field of Search ............... 29/560, 33 P, 563, 564, 29/27 A, 27 C; 408/69, 70; 409/163, 219, 164, 225; 198/345.3, 465.1, 465.3, 346.1, 474.11; 414/225, 749; 364/474.11

[56] References Cited

U.S. PATENT DOCUMENTS

| | | | |
|---|---|---|---|
| 3,010,371 | 11/1961 | Riedel | 198/345.3 X |
| 3,543,392 | 1/1971 | Perry et al. | 29/563 |
| 3,576,540 | 4/1971 | Fair et al. | 29/563 X |
| 3,934,700 | 1/1976 | Schubert et al. | 198/345.3 |
| 4,239,445 | 12/1980 | Ozawa | 414/749 |
| 4,423,806 | 1/1984 | Osasawara | 198/346.1 |
| 4,485,911 | 12/1984 | Cameron | 198/345.3 |
| 4,794,686 | 1/1989 | Moore | 29/33 P |
| 4,841,431 | 6/1989 | Takagi et al. | 364/474.11 X |
| 5,078,254 | 1/1992 | Colonius et al. | 29/33 P X |

FOREIGN PATENT DOCUMENTS

| | | | |
|---|---|---|---|
| 254043 | 1/1988 | European Pat. Off. | 414/225 |
| 1315227 | 6/1987 | U.S.S.R. | 414/225 |

Primary Examiner—William Briggs
Attorney, Agent, or Firm—Morton J. Rosenberg; David I. Klein

[57] ABSTRACT

A multipurpose cutting metal-working machine for the processes of deep hold making, boring, milling, drilling and cutting. The machine includes a tool drive unit which has a first horizontally vertically adjustable tool socket above a second horizontally adjustable tool socket at right angles for holding and driving different cutting metal-working tools, a track around the machine base thereof, a plurality of work tables movably supported on the track to carry metal workpieces into operative positions for processing by the cutting metal-working tool held in the first or second tool socket, a tool holder and a plurality of tool supports longitudinally aligned with the second tool socket for holding a long cutting metal-working tool in making deep holes on metal workpieces.

6 Claims, 7 Drawing Sheets

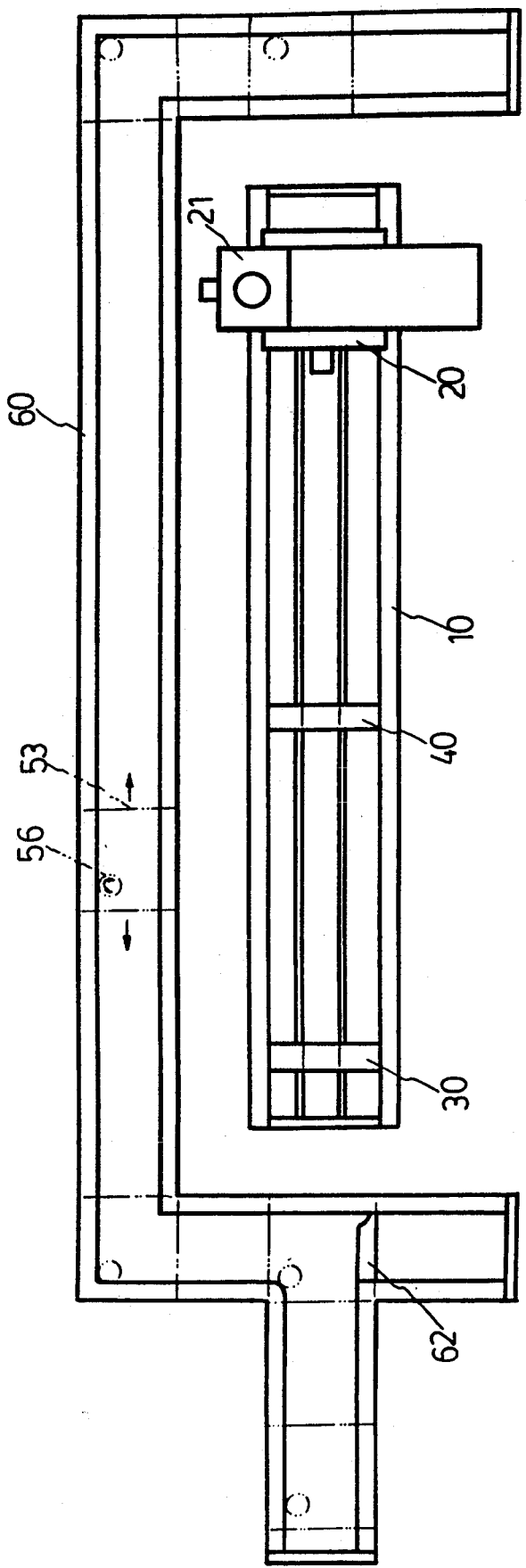
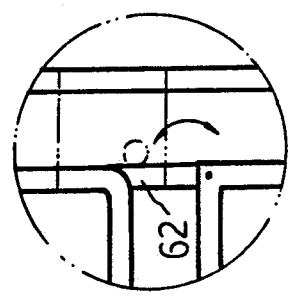
FIG.7A
FIG.7B

5,241,732

MULTIPURPOSE CUTTING METAL-WORKING MACHINE

BACKGROUND OF THE INVENTION

The present invention relates to a multipurpose cutting metal-working machine for the processes of deep hole making, boring, drilling, milling, cutting and etc.

FIG. 1 illustrates a cutting metal-working machine for making deep holes on metal workpieces according to the prior art. In this structure of cutting metal-working machine, the metal workpiece to be processed is held by a tool fixture and rotated on the cutting metal-working tool. Because the metal workpiece to be processed is driven to make a rotary motion relative to the cutting metal-working tool, the tool fixture bears a heavy load during the operation of the machine. Furthermore, the cutting metal-working tool can not be adjusted in all directions. Therefore, there is a limitation on the shape and weight of the metal workpiece to be processed and the location of the deep hole to be made on the metal workpiece.

SUMMARY OF THE INVENTION

The present invention eliminates the aforesaid problems. It is therefore an object of the present invention to provide a multipurpose cutting metal-working machine which is suitable for processing metal workpieces of different sizes and shapes. It is another object of the present invention to provide a multipurpose cutting metal-working machine which performs the processes of deep hole making, boring, drilling, milling, cutting and etc. It is still another object of the present invention to provide a multipurpose cutting metal-working machine which uses a horizontally vertically adjustable tool drive unit to feed and rotate a cutting metal-working tool in processing a fixed metal workpiece. It is still another object of the present invention to provide a multipurpose cutting metal-working machine which consumes less electric power supply. It is still another object of the present invention to provide a multipurpose cutting metal-working machine which is suitable for processing any of a variety of metal workpiece horizontally as well as vertically.

BRIEF DESCRIPTION OF THE DRAWINGS

FIG. 7A is a top plan view showing that the work table can be moved on the track;

FIG. 7B is a partly enlarged view taken on FIG. 7A showing the positioning of a switch blade in the track;

DETAILED DESCRIPTION OF THE PREFERRED EMBODIMENT

Figure 1:
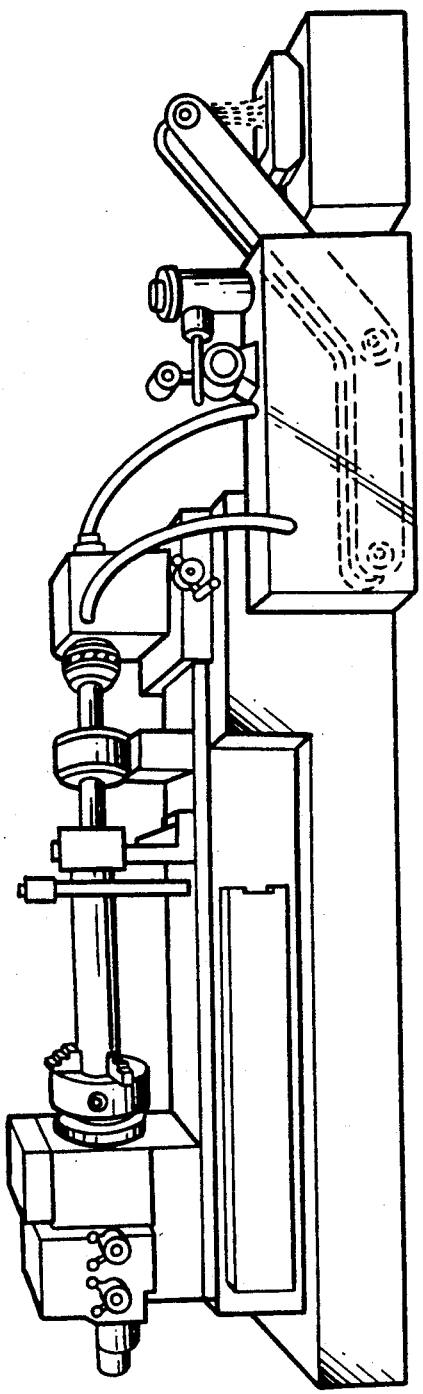
FIG. 1 illustrates a deep hole making metal-working machine according to the prior art.
Figure 2:
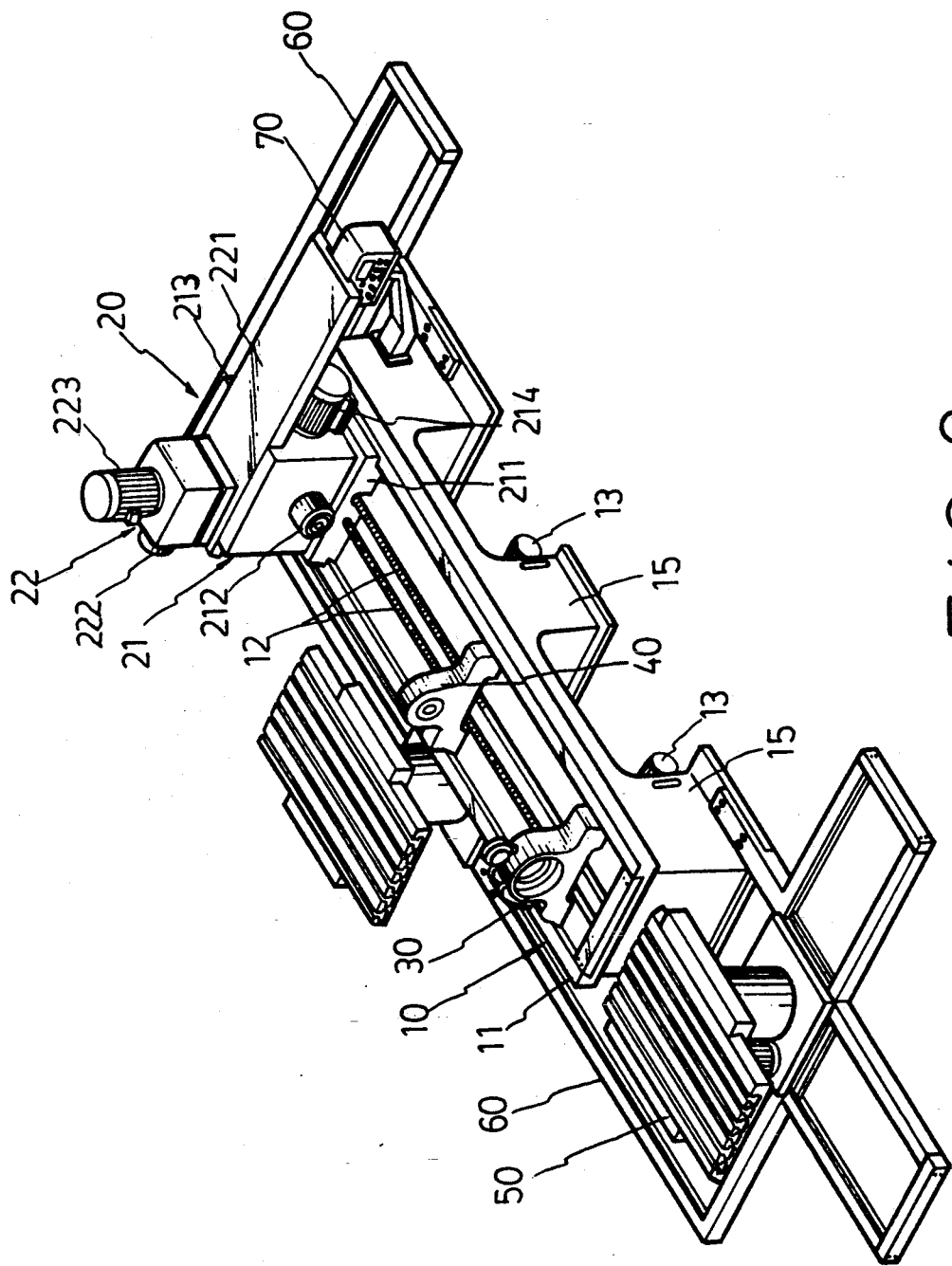
FIG. 2 is an elevational view of a multipurpose cutting metal-working machine according to the present invention.

Referring to FIG. 2, a multipurpose cutting metal-working machine as constructed in accordance with the present invention is generally comprised of a machine base 10, a tool drive unit 20, a tool holder 30, a tool support 40, a plurality of work table 50, and a track 60. The machine base 10 is supported on a plurality of stands 15, having a dovetail groove 11 on the top edge thereof in longitudinal direction, which receives the tool holder 30, the tool support 40 and the tool drive unit 20, and two separate guide screws 12 in the dovetail groove 11 to guide movement of the tool drive unit 20 in the dovetail groove 11. The stands 15 have each a cooling oil pumping system (not shown) controlled by a respective oil pump 13 to deliver a cooling oil to the tool holder 30 for cooling the cutting tool. The tool drive unit 20 is consisted of a top block 22 and a bottom block 21. The bottom block 21 is supported on a carriage 211 coupled to the guide screws 12, having a horizontal taper socket 212 on one side which receives the cutting tool, a motor 214 on an adjacent side controlled to rotate the horizontal taper socket 212, and a dovetail groove 213 on the top edge thereof in latitudinal direction (namely, at right angle relative to the dovetail groove 11 on the machine base 10). The top block 22 comprises a slide plate 221 on the bottom movably inserted in the dovetail groove 213 on the bottom block 21, a horizontal taper socket 222 on one side in direction opposite to the slide plate 221, and a motor 223 on the top controlled to rotate the taper socket 222. The track 60 is fastened to the machine base 10 surrounding the stands 15. The work tables 50 are mounted on the track 60 and controlled to move thereon by a respective motor 55.

Figure 3:
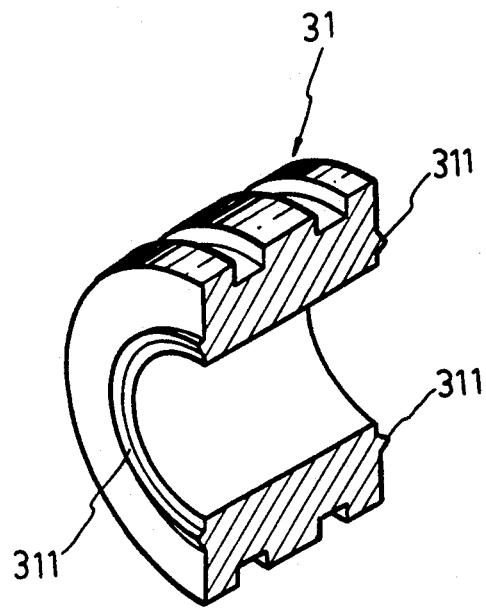
FIG. 3 is a cross section of a tool socket according to the present invention.
Figure 4A:
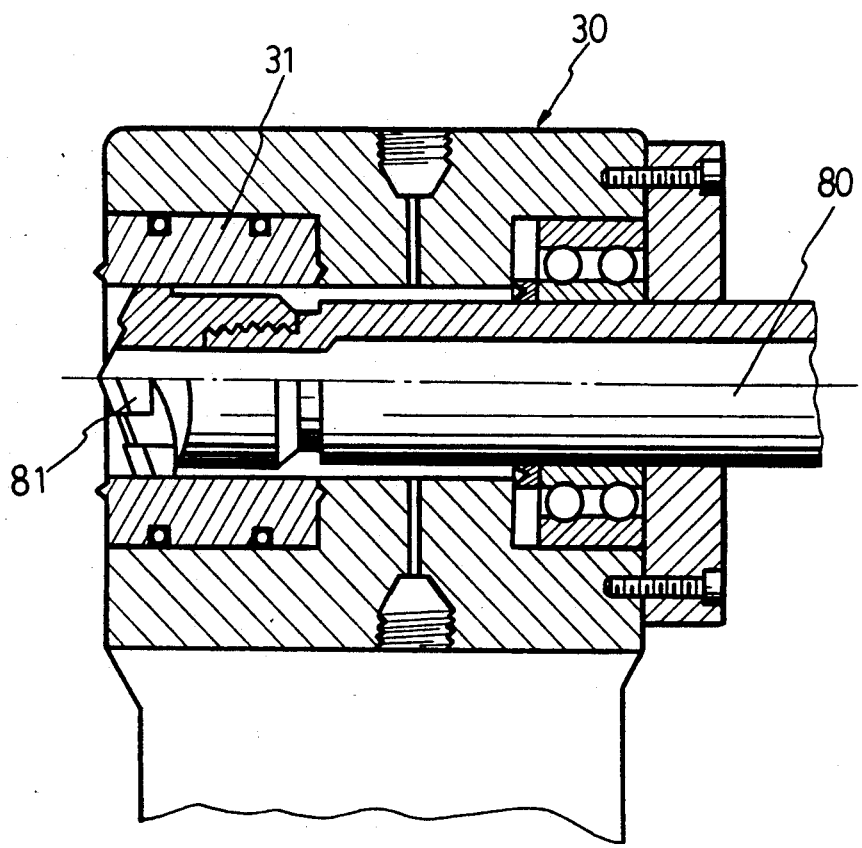
FIG. 4A is a sectional view showing that a cutting tool is held in the tool socket of the tool holder.
Figure 4B:
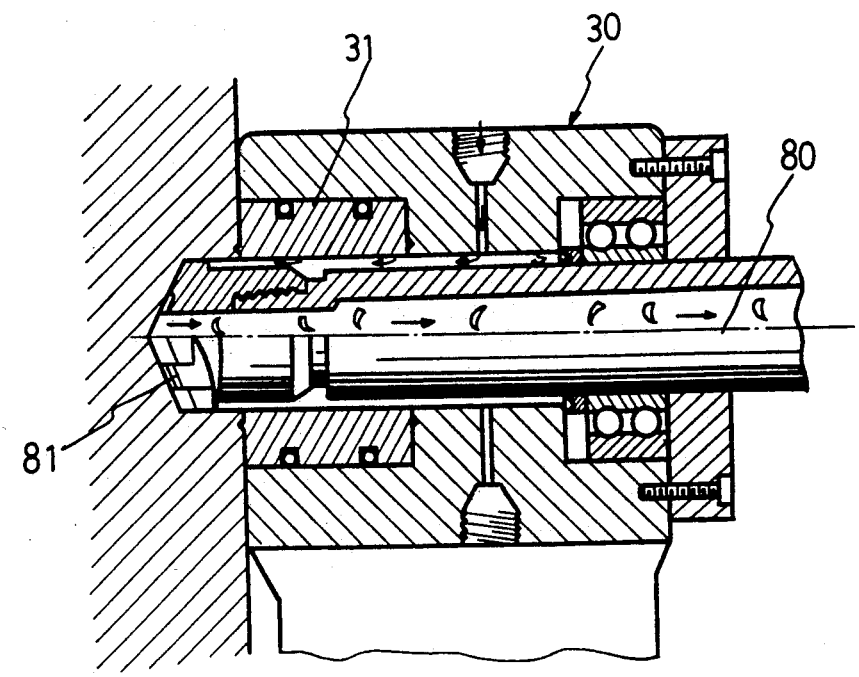
FIG. 4B illustrates that cooling oil is pumped into the tool holder to cool down the tip of the cutting tool and remove metal chips.
Figure 5:
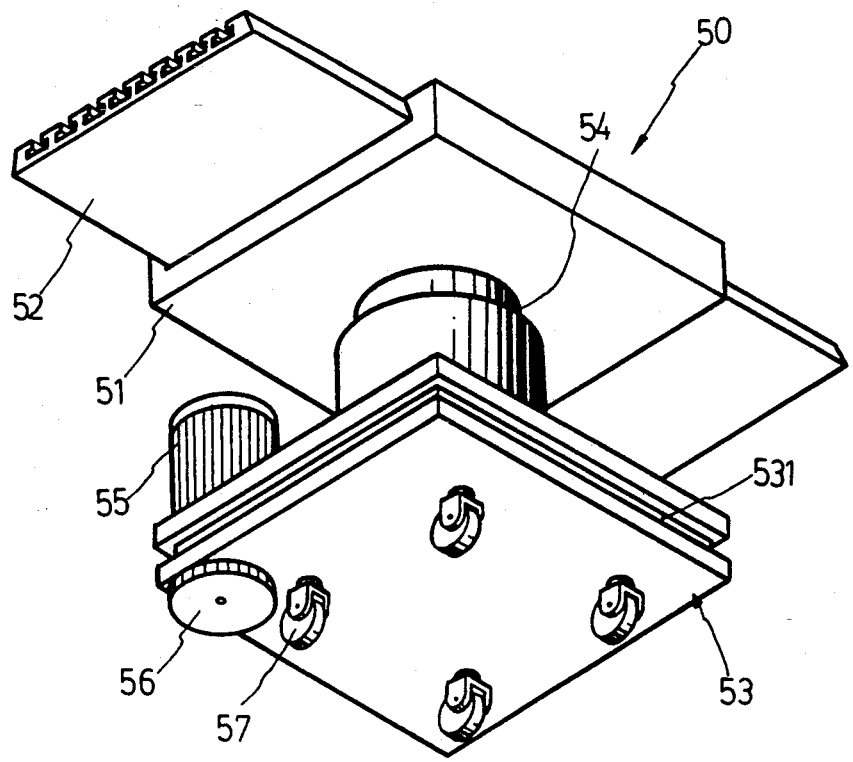
FIG. 5 illustrates the structure of a work table according to the present invention.
Figure 6:
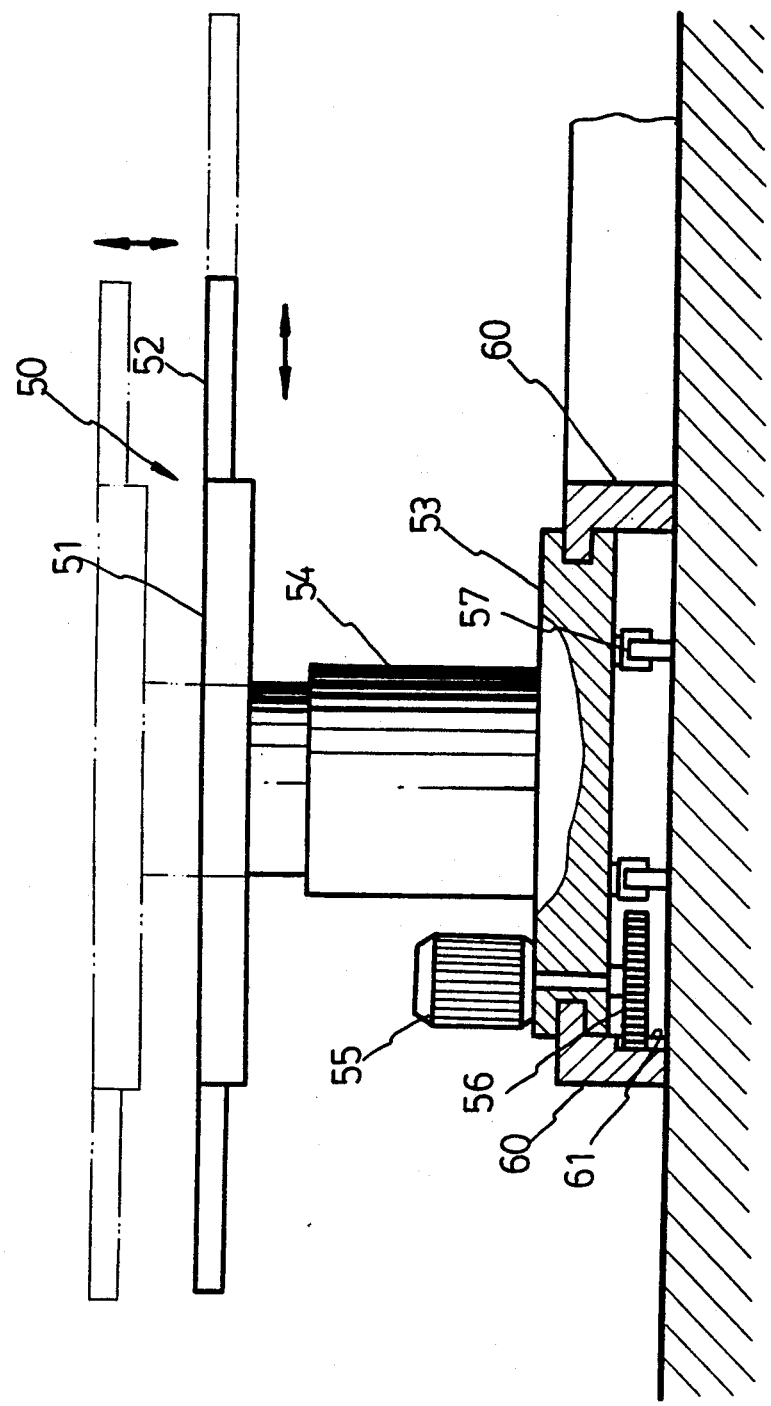
FIG. 6 illustrates the positioning of the work table in a track according to the present invention.

Referring to FIGS. 3, 4A and 4B, the tool holder 30 is to carry the cutting tool by a tool socket 31. The tool socket 31 has a pointed, annular flange 311 on the front edge around the front orifice thereof, which engages the outside surface of the metal workpiece to be processed to hold it tightly in place. When in operation, the tip 81 of the cutting tool is continuously cooled down by a continuous flow of cooling oil pumped by the oil pumps 13 on the stands 15. At the same time, the handle 80 of the cutting tool is washed with the continuous flow of cooling oil, and therefore the handle 80 and the tip 81 of the cutting tool are not jammed by metal chips. Because the handle 80 of the cutting tool for making deep holes has a certain length, it must be properly supported in order to maintain its structural integrity. The tool support 40 is used for this purpose. However, more tool supports may be used according to the total length of the handle 60 of the cutting tool to be used.

Referring to FIGS. 5, 6, 7A and 7B, the work table 50 comprises an upper deck 51 supported on a base 53 by a lifting gear 54 to hold a channeled plate 52 through a dovetail joint. Therefore, the channeled plate 52 can be moved on the upper deck 51 to and fro. The base 53 of the work table 50 comprises a locating groove 531 around the peripheral edge thereof, a plurality of universal castors 57 and a gear 56 on the bottom, a motor 55 on the top controlled to rotate the gear 56 (see FIG. 5). When placed in the track 60, the base 53 of the work table 50 is supported on the track 60 by the universal castors 57 with the gear 56 meshed with a rack 61 on the track 60, and the locating groove 531 of the base 53 is bilaterally engaged by two opposite inward flanges (not indicated) of the track 60 (see FIG. 6). By means of the operation of the lifting gear 54, the upper deck 51 can be lifted from the base 53 or lowered to the desired height. Rotating the motor 55 causes the work table 50 to slide on the track 60. The motor 55 is reversible, and therefore the work table 50 can be moved forwards and backwards on the track 60. The track 60 further comprises switch blades 62 at respective corners for changing the moving direction of the work table 50 through right angle. There is also provided a control box 70 for controlling the operation of the multipurpose cutting metal-working machine, which can be a numerical control or computerized numerical control.

Figure 8:
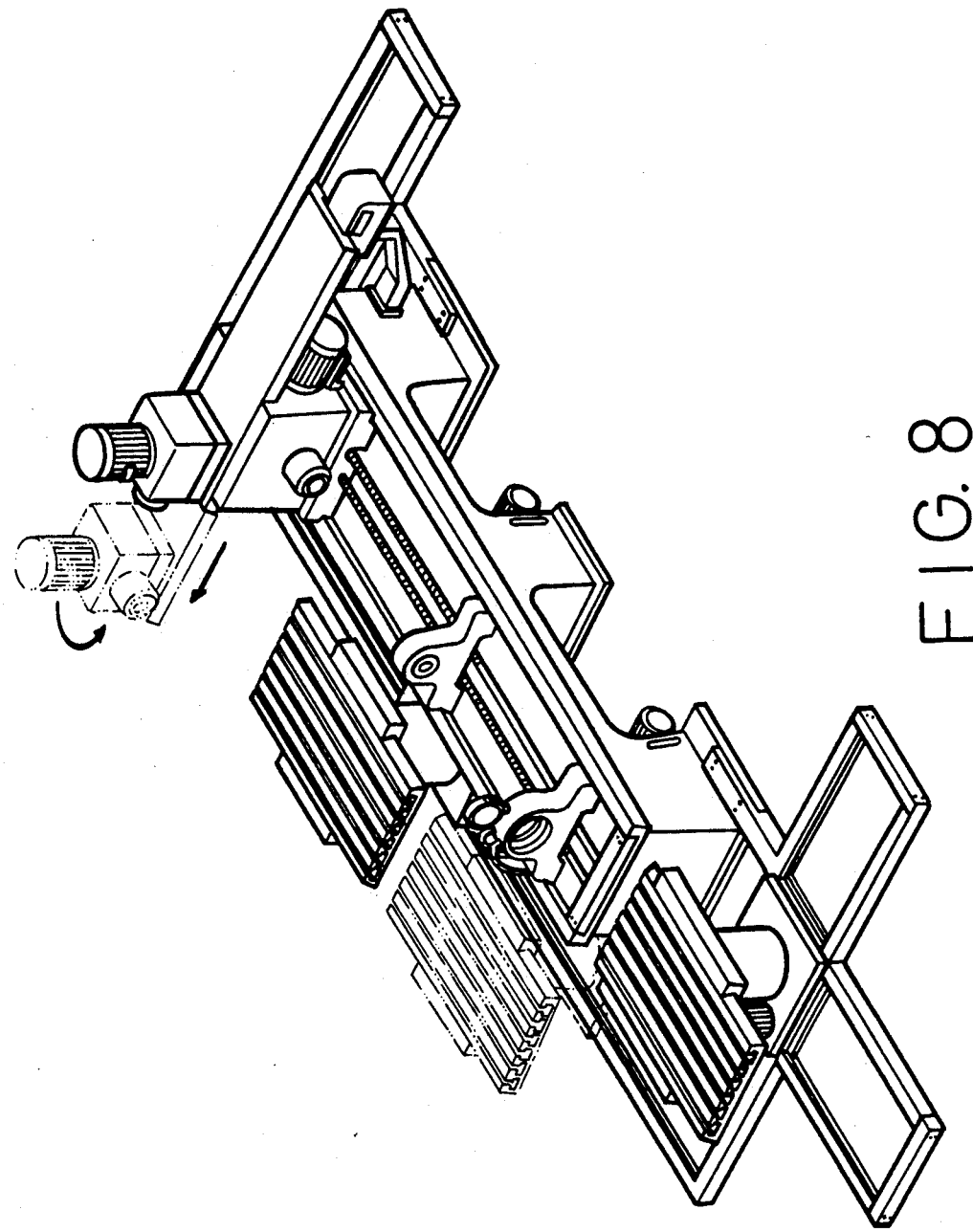
FIG. 8 illustrates that several work tables can be arranged on the track at different locations for processing different metal workpieces.

Referring to FIG. 8, a plurality of work tables 50 may be mounted on the track 60 and moved to the desired locations for holding different metal workpieces. The taper socket 222 on the top block 22 of the tool drive unit 20 may be adjusted to the desired level and position to drive a cutting tool for processing a metal workpiece.

For making a gun barrel as an example, the operation of the present invention is outlined hereinafter. A primarily processed steel billet is fixed to the channeled plate 52 on either work table 50 by a fixture, and the work table 50 is moved to the tool drive unit 20. The steel billet is treated through the process of milling by a milling cutter which is carried by the taper socket 222 on the top block 22 of the tool drive unit 20 to form a smooth end edge. After the process of milling, the steel billet is carried by the work table 50 to another position in front of the tool holder 30 permitting the smooth end edge of the steel billet to be in line with the cutting metal-working tool which is carried on the tool holder 30, the tool supports 40 and the taper socket 212 on the bottom block 21 of the tool drive unit 20 for making a deep hole. By means of the operation of the guide screws 12 and the motor 214, the cutting metal-working tool is fed and rotated in making a deep hole on the steel billet. By changing the cutting metal-working tool, deep holes of different shapes and sizes can be conveniently made on any of a variety of metal workpieces. Therefore, a gun barrel can be efficiently made by the present multipurpose cutting metal-working machine.

What is claimed is:

1. A multipurpose cutting metal-working machine comprised of a rectangular machine base, a tool holder, a plurality of tool supports, a tool drive unit, a track and a plurality of work tables, and characterized in that said tool holder and said tool drive unit are movably mounted on a dovetail groove on said machine base and longitudinally aligned on two opposite ends; said tool supports are mounted on the dovetail groove on said machine base and spaced between said tool holder and said tool drive unit; said track is fastened to said machine base around three sides thereof to carry said work tables; said work tables are movably supported on said track to carry metal workpieces; said drive unit carries a cutting metal-working tool to move to and fro on said tool holder and said tool supports and drives it to process a metal workpiece fixed to said work tables.

2. The multipurpose cutting metal-working machine according to claim 1, wherein said tool holder comprises a tool socket to hold a cutting metal-working tool, said tool socket having a pointed, annular front flange around a front orifice thereof for engaging the metal workpiece to be processed in place.

3. The multipurpose cutting metal-working machine according to claim 1, wherein said work tables comprise each an upper deck supported on a base by a lifting gear to hold a channeled plate through a dovetail joint, the base of said work tables being supported on said track by a plurality of universal castors and comprising a locating groove, into which two inward flanges on said track fit, and a gear meshed with a rack on said track and driven to rotate by a motor.

4. The multipurpose cutting metal-working machine according to claim 1, wherein said track comprises switch blades on respective corners thereof for changing the moving direction of said work tables on said track.

5. The multipurpose cutting metal-working machine according to claim 1, wherein said tool drive unit is comprised of a top block and a bottom block, said bottom block being supported on a carriage and carried by it to slide on the dovetail groove on said machine base and comprising a horizontal taper socket on one side for holding a cutting metal-working tool the cutting tool, said top block being movably mounted on said bottom block at right angle and comprising a horizontal taper socket on one side at right angle relative to the horizontal taper socket on said bottom block for holding a cutting metal-working tool.

6. The multipurpose cutting metal-working machine according to claim 1, wherein said machine base comprises two separate guide screws controlled to guide said tool drive unit in sliding on the dovetail groove on said machine base.

* * * * *